United States Patent
Yamano et al.

(10) Patent No.: US 11,695,148 B2
(45) Date of Patent: Jul. 4, 2023

(54) FUEL CELL SYSTEM

(71) Applicant: HONDA MOTOR CO., LTD., Tokyo (JP)

(72) Inventors: Naoki Yamano, Saitama (JP); Tadashi Nomura, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/676,845

(22) Filed: Feb. 22, 2022

(65) Prior Publication Data

US 2022/0311040 A1 Sep. 29, 2022

(30) Foreign Application Priority Data

Mar. 29, 2021 (JP) .................................. 2021-055220

(51) Int. Cl.
| | |
|---|---|
| *H01M 8/04* | (2016.01) |
| *H01M 8/2483* | (2016.01) |
| *H01M 8/1004* | (2016.01) |
| *H01M 8/241* | (2016.01) |
| *H01M 8/04701* | (2016.01) |
| *H01M 8/04014* | (2016.01) |

(52) U.S. Cl.
CPC ..... *H01M 8/2483* (2016.02); *H01M 8/04014* (2013.01); *H01M 8/04701* (2013.01); *H01M 8/1004* (2013.01); *H01M 8/241* (2013.01)

(58) Field of Classification Search
CPC .......... H01M 8/2483; H01M 8/04014; H01M 8/04701; H01M 8/1004; H01M 8/241
See application file for complete search history.

(56) References Cited

U.S. PATENT DOCUMENTS

2006/0246332 A1 11/2006 Higashi
2015/0280269 A1* 10/2015 Suzuki ................ H01M 8/2483
429/458

FOREIGN PATENT DOCUMENTS

| JP | 2002050391 A | 2/2002 |
|---|---|---|
| JP | 2003123805 A | 4/2003 |
| JP | 2004288509 A | 10/2004 |
| JP | 2017216051 A | 12/2017 |

OTHER PUBLICATIONS

Notification of Reasons for Refusal issued in the JP Patent Application No. 2021-055220, dated Feb. 7, 2023.

* cited by examiner

*Primary Examiner* — Olatunji A Godo
(74) *Attorney, Agent, or Firm* — CKC & Partners Co., LLC (57) ABSTRACT

Provided is a fuel cell system including a plurality of fuel cell stacks, in which with a simple configuration, air retention is unlikely to occur in cooling water and a flow rate of the cooling water to each fuel cell stack can be uniformized. In a fuel cell system including a plurality of fuel cell stacks provided with a coolant flow path through which a coolant flows, the plurality of fuel cell stacks are juxtaposed in a horizontal direction, and include a supply pipeline that distributes and supplies the coolant to the coolant flow path, and a discharge pipeline that collects and discharges the coolant that has flowed through the coolant flow path, and the supply pipeline and the discharge pipeline are provided within a formation range where the coolant flow path is formed in the plurality of fuel cell stacks, in a direction of gravity.

7 Claims, 6 Drawing Sheets

FUEL CELL SYSTEM

This application is based on and claims the benefit of priority from Japanese Patent Application No. 2021-055220, filed on 29 Mar. 2021, the content of which is incorporated herein by reference.

BACKGROUND OF THE INVENTION

Field of the Invention

The present invention relates to a fuel cell system.

Related Art

Heretofore, a fuel cell system is known in which a fuel cell is used. The fuel cell system is, for example, constituted of a fuel cell stack having a stack structure where several tens to several hundreds of cells are stacked. On supplying a hydrogen gas as a reactant gas to an anode electrode of the fuel cell stack and supplying air containing oxygen as a reactant gas to a cathode electrode, power generation is performed by electrochemical reaction.

Additionally, each fuel cell is provided with a circulation path through which cooling water flows. Cooling water is supplied between separators of the fuel cell, and cools the fuel cell to raise a temperature, but the cooling water is cooled by performing heat exchange with a heat exchanger and supplied again to the fuel cell. In the fuel cell system including the circulation path, there is a problem such as an insufficient amount of supply water due to air remaining in the circulation path, reduced energy efficiency required for supply of cooling water, or the like. To solve the problem, a configuration of the fuel cell system is suggested in which a branch pipe having an upper end connected to an air exhaust container is connected to a piping part at a relatively elevated position in the circulation path (e.g., see Patent Document 1).

Patent Document 1: Japanese Unexamined Patent Application, Publication No. 2003-123805

SUMMARY OF THE INVENTION

In a fuel cell system disclosed in Patent Document 1, a circulation path is provided with a relatively elevated position, and an air exhaust container is further connected to the circulation path, which causes problems that a configuration of a pipeline is complicated and that an installation space for a large fuel cell system is required. Also, in the fuel cell system including a plurality of fuel cell stacks, the current situation is that no consideration is given to how to construct the circulation path such that a flow rate of cooling water supplied to each fuel cell stack does not vary.

An object of the present invention, which has been made in view of the above situation, is to provide a fuel cell system including a plurality of fuel cell stacks, in which with a simple configuration, air retention is unlikely to occur in cooling water and a flow rate of the cooling water to each fuel cell stack can be uniformized.

A first aspect of the present invention is directed to a fuel cell system including a plurality of fuel cell stacks each provided with a coolant flow path through which a coolant flows. The plurality of fuel cell stacks are juxtaposed in a horizontal direction, and include a supply pipeline that distributes and supplies the coolant to the coolant flow path, and a discharge pipeline that collects and discharges the coolant that has flowed through the coolant flow path. The supply pipeline and the discharge pipeline are provided within a formation range where the coolant flow path is formed in the plurality of fuel cell stacks, in a direction of gravity.

The first aspect of the present invention can provide the fuel cell system including the plurality of fuel cell stacks, in which with a simple configuration, air retention is unlikely to occur in cooling water and a flow rate of the cooling water to each fuel cell stack can be uniformized.

A second aspect is an embodiment of the first aspect. In the fuel cell system according to the second aspect, the supply pipeline slopes downward with respect to the horizontal direction from an upstream side to a downstream side, and the discharge pipeline slopes upward with respect to the horizontal direction from the upstream side to the downstream side.

The second aspect of the present invention can provide the fuel cell system in which air retention is unlikely to occur in the supply pipeline and the discharge pipeline.

A third aspect is an embodiment of the first or second aspect. In the fuel cell system according to the third aspect, the supply pipeline and the discharge pipeline are flow paths extending from one end side to an other end side of the plurality of juxtaposed fuel cell stacks, and the discharge pipeline is provided closer to the plurality of fuel cell stacks than the supply pipeline.

The third aspect of the present invention can provide the fuel cell system that is highly safe during maintenance or the like.

A fourth aspect is an embodiment of any one of the first to third aspects. The fuel cell system according to the fourth aspect further includes: a supply side connecting part that connects the coolant flow path to the supply pipeline; and a discharge side connecting part that connects the coolant flow path to the discharge pipeline. At least one of the supply side connecting part and the discharge side connecting part is a removable connecting part.

The fourth aspect of the present invention can improve maintainability of the fuel cell system.

A fifth aspect is an embodiment of the first aspect. The fuel cell system according to the fifth aspect further includes: a heat exchanger that cools the coolant; and a connecting part that connects an upstream side end portion of the supply pipeline to a downstream side end portion of the discharge pipeline. The connecting part is provided in the heat exchanger.

The fifth aspect of the present invention makes it possible to eliminate a difference in ions eluted in the coolant, the difference being caused by a difference in power consumption between the fuel cell stacks and allows the fuel cell stacks to have uniform durability. Thus, the fuel cell system 1 according to the fifth aspect is highly durable.

A sixth aspect is an embodiment of the fifth aspect. The fuel cell system according to the sixth aspect includes a plurality of power suppliers each including the plurality of fuel cell stacks juxtaposed in the horizontal direction, the supply pipeline, and the discharge pipeline. The plurality of power suppliers are arranged in the direction of gravity, and include a coupling flow path that couples, to each other, the connecting parts of the plurality of power suppliers.

According to the sixth aspect of the present invention, also in the plurality of power suppliers, effects similar to those of the fifth aspect can be obtained, and durability of the fuel cell system can be improved.

A seventh aspect is an embodiment of the fourth aspect. In the fuel cell system according to the seventh aspect, the fuel cell stack has a surface which is adjacent to one end side and on which the supply side connecting part and the discharge side connecting part are arranged, and a surface which is adjacent to an other end side and which faces the surface adjacent to the one end side. The surface adjacent to the other end side is provided with an exhaust port through which a gas retained in the coolant is exhausted to an outside of the fuel cell stack. The exhaust port is provided above the supply side connecting part and the discharge side connecting part in the direction of gravity.

The seventh aspect of the present invention makes it possible to desirably remove air from the coolant in the fuel cell stacks.

An eighth aspect is an embodiment of the sixth aspect. The fuel cell system according to the eighth aspect further includes a replenishment port that replenishes the coolant flow path with the coolant. The replenishment port is provided in an uppermost portion of the supply pipeline or the discharge pipeline in the power supplier disposed most upward in the direction of gravity.

According to the eighth aspect of the present invention, by replenishment of the coolant from one position, air retained in the supply pipeline and the discharge pipeline can be exhausted, and the coolant can be supplied into the fuel cell system.

DETAILED DESCRIPTION OF THE INVENTION

Hereinafter, description will be made as to one embodiment of the present invention with reference to the drawings. The present invention is not limited to the following embodiment and may be appropriately changed and implemented within the scope of the present invention.

<Fuel Cell System>

Figure 1:
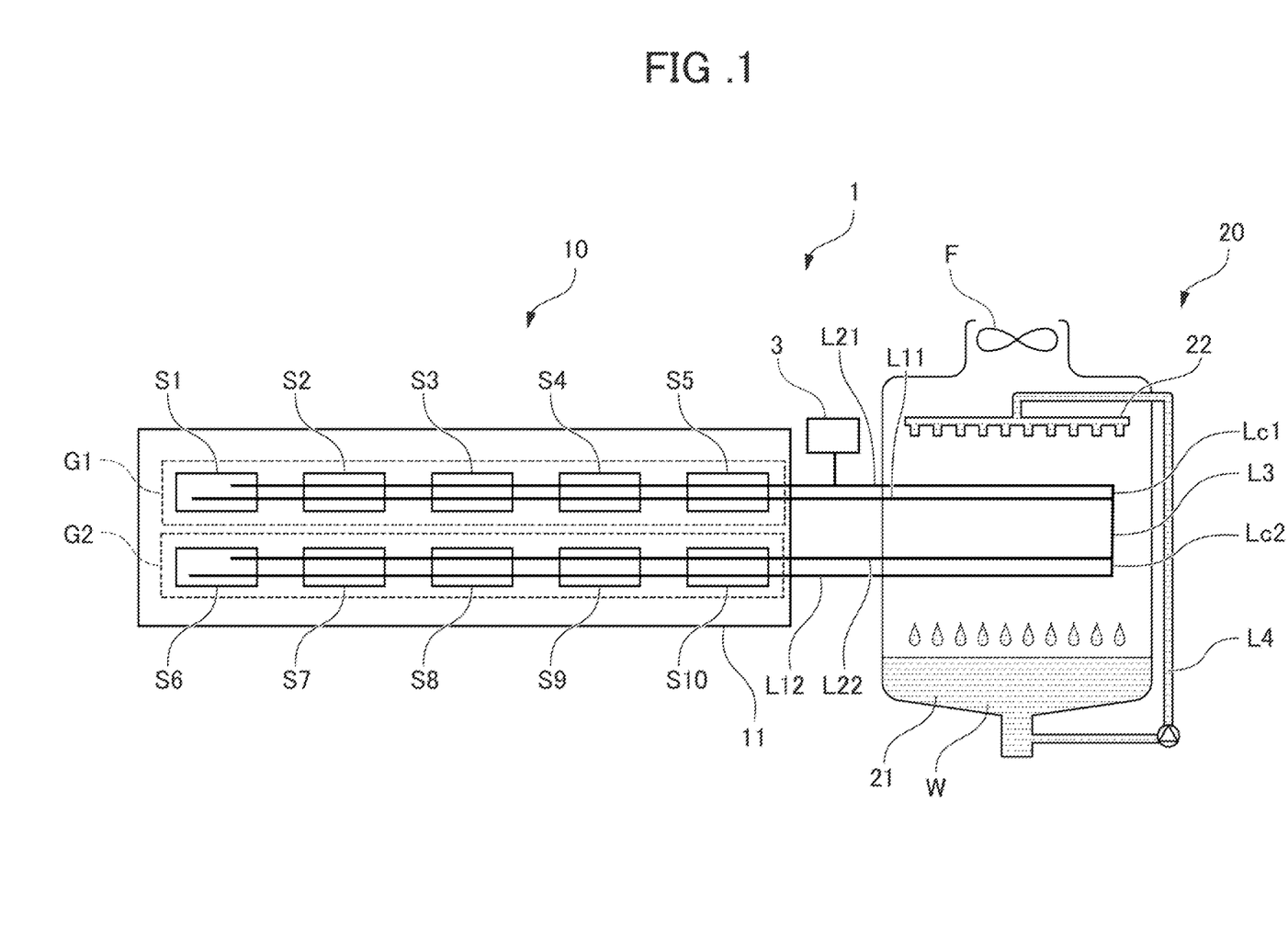
FIG. 1 is a side view schematically showing a fuel cell system according to one embodiment of the present invention.

FIG. 1 is a side view showing a schematic configuration of a fuel cell system according to the present embodiment. A fuel cell system 1 includes a power generation unit 10 including power suppliers G1 and G2, and a heat exchanger 20 that performs heat exchange to cool cooling water supplied to the power suppliers G1 and G2. The fuel cell system 1 is a stationary system, and may be used, for example, as an emergency power source.

(Power Generation Unit)

The power generation unit 10 includes a plurality of power suppliers G1 and G2, and a container 11 that contains the power suppliers. In the following, the plurality of power suppliers of the present embodiment will be described as two power suppliers G1 and G2. However, the plurality of power suppliers may include three or more power suppliers.

(Power Supplier)

The power suppliers G1 and G2 are arranged in a direction of gravity. In the present embodiment, the power supplier G1 is installed above the power supplier G2 in the direction of gravity. The power suppliers G1 and G2 include a plurality of fuel cell stacks S1 to S5, and S6 to S10, respectively. The number of the fuel cell stacks that form each power supplier is not particularly limited to the above number. The respective fuel cell stacks S1 to S5 and S6 to S10 in the power suppliers G1 and G2 are juxtaposed in a horizontal direction, respectively. Each fuel cell stack is disposed, for example, on a shelf or the like provided in the container 11. Each fuel cell stack may be disposed on horizontal maintenance means. Further, the container 11 may be disposed on a seismic isolation device. Consequently, a disposed state of each fuel cell stack may be maintained horizontal.

The power suppliers G1 and G2 include a supply pipeline that distributes and supplies a coolant flowing through a coolant flow path in the fuel cell stacks, and a discharge pipeline that collects and discharges the coolant flowing through the coolant flow path. As shown in FIG. 1, the power supplier G1 includes a supply pipeline L11 and a discharge pipeline L21, and the power supplier G2 includes a supply pipeline L12 and a discharge pipeline L22. Hereinafter, description will be made using the supply pipeline L11 and the discharge pipeline L21 in the power supplier G1 as an example, and a similar configuration is also applicable to the power supplier G2.

[Supply Pipeline and Discharge Pipeline]

Figure 3:
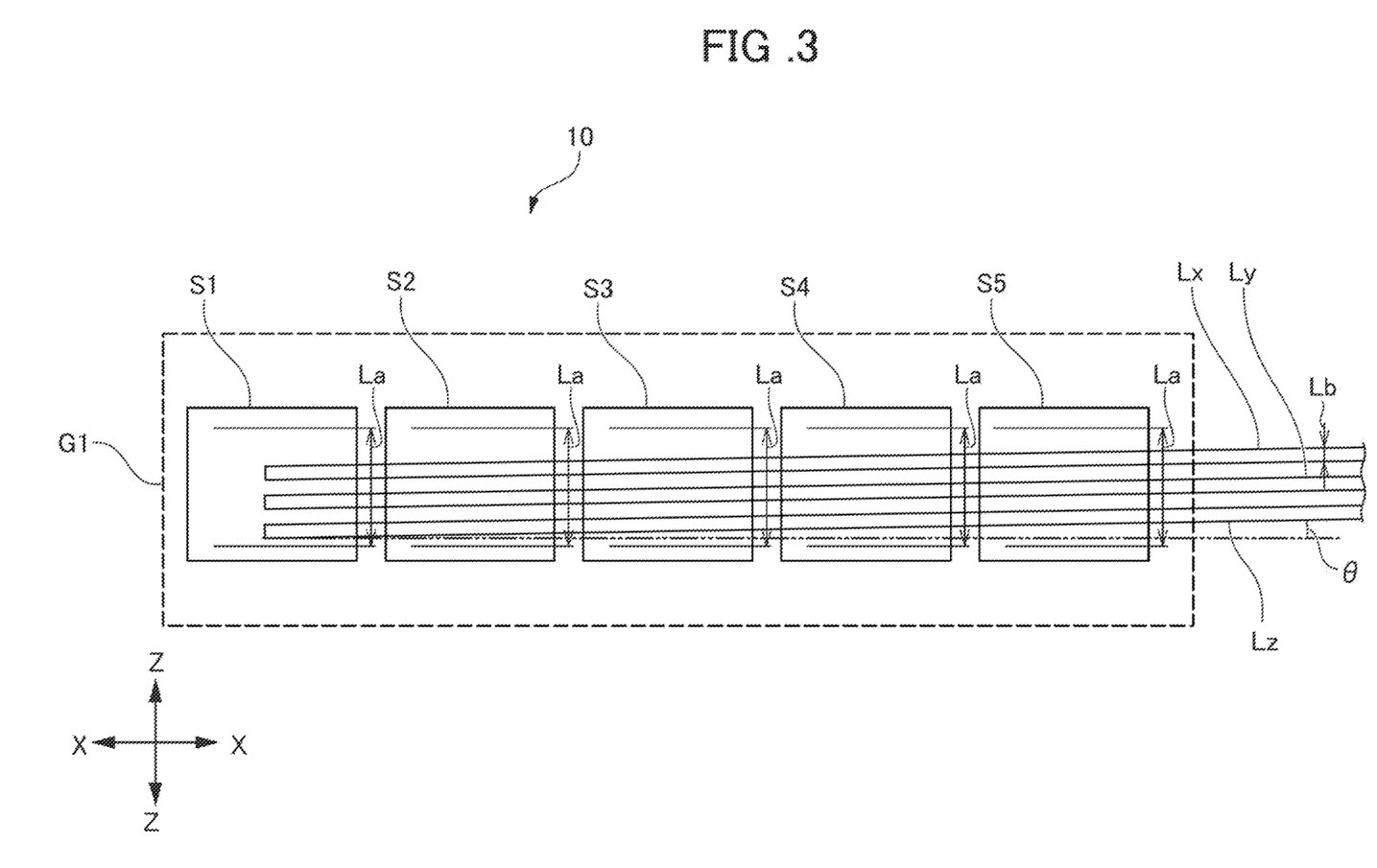
FIG. 3 is a side view schematically showing a power supplier according to an embodiment.

The supply pipeline L11 and the discharge pipeline L21 are flow paths extending from one end side to the other end side of the plurality of juxtaposed fuel cell stacks S1 to S5. Specifically, the supply pipeline L11 and the discharge pipeline L21 are arranged along the same surface of the plurality of juxtaposed fuel cell stacks. As shown in FIG. 3, the supply pipeline L11 and the discharge pipeline L21 are arranged within a formation range La where the coolant flow path is formed in each of the plurality of fuel cell stacks S1 to S5, in a Z-direction as the direction of gravity. This can suppress air retention in the fuel cell stacks, and uniformize a flow rate of the coolant supplied to each fuel cell stack.

Flow paths Lx, Ly and Lz shown in FIG. 3 show positions where the supply pipeline L11 and the discharge pipeline L21 may be arranged. The position where the supply pipeline L11 and the discharge pipeline L21 are arranged is most preferably Lx, next preferably Ly, and next preferably Lz. The supply pipeline L11 and the discharge pipeline L21 are arranged above a center in the direction of gravity, within the formation range La where coolant flow path is formed, and thereby can suppress air retention in the fuel cell stacks. Also, as shown in FIG. 3, it is preferable that the supply pipeline L11 and the discharge pipeline L21 have a downward slope at any angle θ from a fuel cell stack S5 side to a fuel cell stack S1 side. This can suppress air retention in the supply pipeline and the discharge pipeline.

Figure 2:
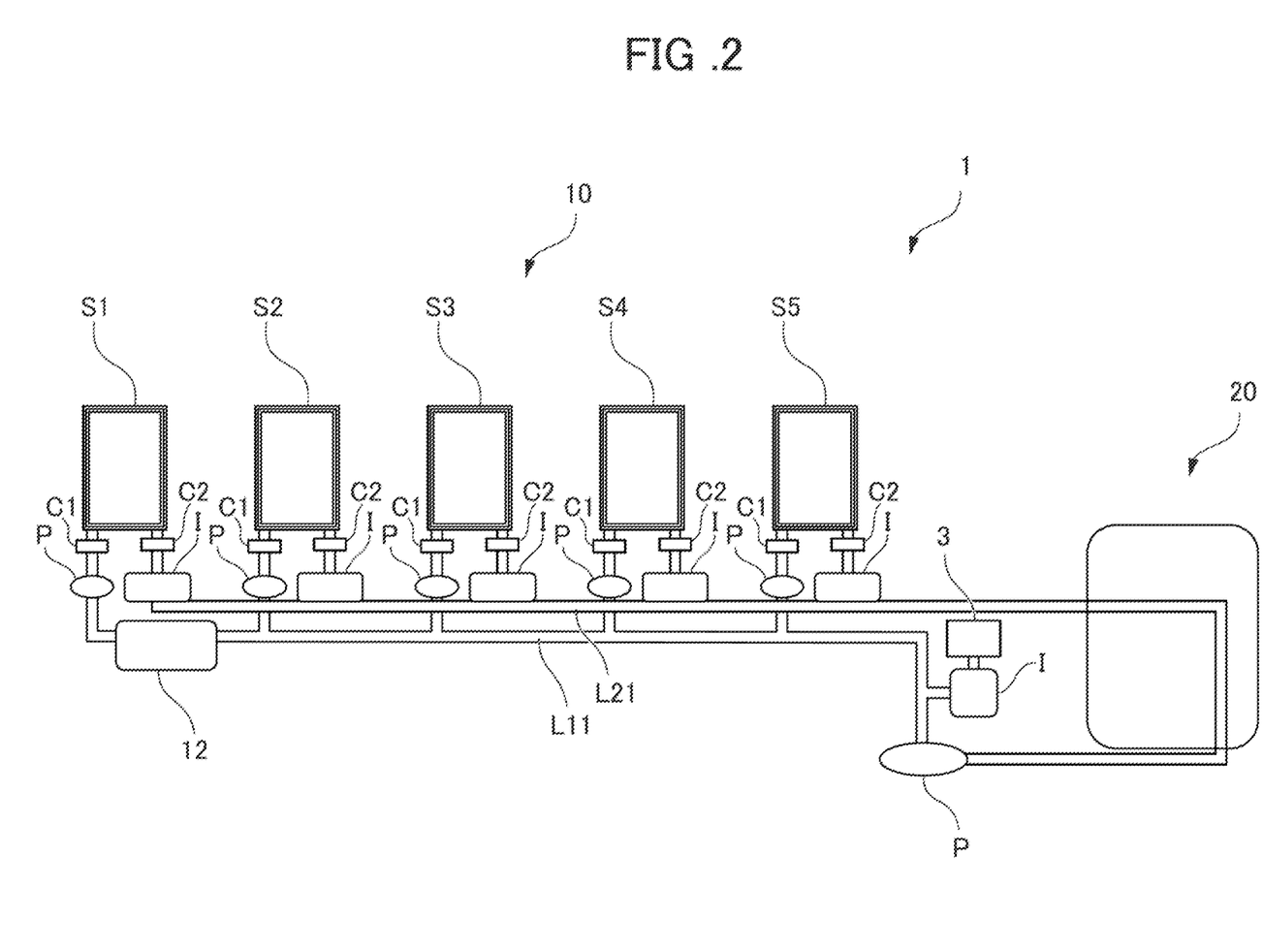
FIG. 2 is a top view schematically showing the fuel cell system according to the embodiment.

As shown in FIG. 2, the supply pipeline L11 is a flow path extending from the fuel cell stack S5 side that is an upstream side toward the fuel cell stack S1 side that is a downstream side, and the coolant is supplied to each fuel cell stack with a pump P provided in the supply pipeline L11. The supply pipeline L11 has a tournament structure where the pipeline branches to each fuel cell stack. The supply pipeline L11 on the upstream side communicates with the discharge pipeline L21 in an after-mentioned heat exchanger 20. An air-liquid separator 12 may be provided at any position in the supply pipeline L11. The air-liquid separator 12 has a function of exhausting, to outside, air flowing into the supply pipeline L11. The air-liquid separator 12 is preferably provided on an upstream side of the fuel cell stack that first starts among the plurality of fuel cell stacks and may be provided in a vicinity of an after-mentioned supply side connecting part C1 of each fuel cell stack or provided on an upstream side of a fuel cell stack that is closest to the heat exchanger 20.

As shown in FIG. 2, the discharge pipeline L21 is a flow path extending from the fuel cell stack S1 side that is the upstream side toward the fuel cell stack S5 side that is the downstream side and is a flow path to which the coolant flowing through each fuel cell stack is discharged. The discharge pipeline L21 has a tournament structure where the pipeline branches from each fuel cell stack. The discharge pipeline L21 on the downstream side communicates with the supply pipeline L11 in the after-mentioned heat exchanger 20. At any position in the supply pipeline L11 or the discharge pipeline L21, an ion exchanger I may be provided. Ion exchanger I may be arranged as shown in FIG. 2 or, for example, one ion exchanger may be provided in the supply pipeline L11.

As shown in FIG. 2, the discharge pipeline L21 is provided at a position closer to each fuel cell stack than the supply pipeline L11. The coolant flowing through the discharge pipeline L21 has a higher temperature than the coolant flowing through the supply pipeline L11, and hence with the above configuration, the discharge pipeline L21 is disposed at a position that is difficult for any person to touch, which can improve safety during maintenance or the like of the fuel cell system 1. Also, the discharge pipeline L21 is connected to a connecting portion in each fuel cell stack on a heat exchanger 20 side. Consequently, a flow path length of the discharge pipeline L21 can be decreased, and safety of the fuel cell system 1 can further improve.

It is preferable that at least one of the supply side connecting part C1 that connects the supply pipeline L11 and the coolant flow path of each fuel cell stack and a discharge side connecting part C2 that connects the discharge pipeline L21 and the coolant flow path of each fuel cell stack is a removable connecting part. Consequently, each fuel cell stack can be mounted to and removed from the supply pipeline L11 and the discharge pipeline L21, so that maintainability of the fuel cell system 1 can be improved. The removable connecting part is, for example, an easily removable connecting part such as a quick connector.

It is preferable that a replenishment port 3 is provided in an uppermost portion of the supply pipeline L11 or the discharge pipeline L21. The coolant, such as water, circulating in the supply pipeline L11 and the discharge pipeline L21 decreases in amount with continued use of the fuel cell system 1, and is required to be replenished, and the replenishment port 3 having the above configuration is provided, so that the coolant can be supplied while removing air retained in the supply pipeline L11 and the discharge pipeline L21. The replenishment port 3 may only be provided in the uppermost portion of the supply pipeline L11 or the discharge pipeline L21 and does not have any other configuration that is particularly limited. The ion exchanger I may be provided between the replenishment port 3 and the supply pipeline L11 or the discharge pipeline L21.

[Fuel Cell Stack]

Hereinafter, description will be made as to a configuration of each fuel cell stack for use in the fuel cell system 1, with reference to FIGS. 4 to 6. The following description is made using the fuel cell stack S1 as an example, and a similar configuration is also applicable to the other fuel cell stacks.

Figure 4:
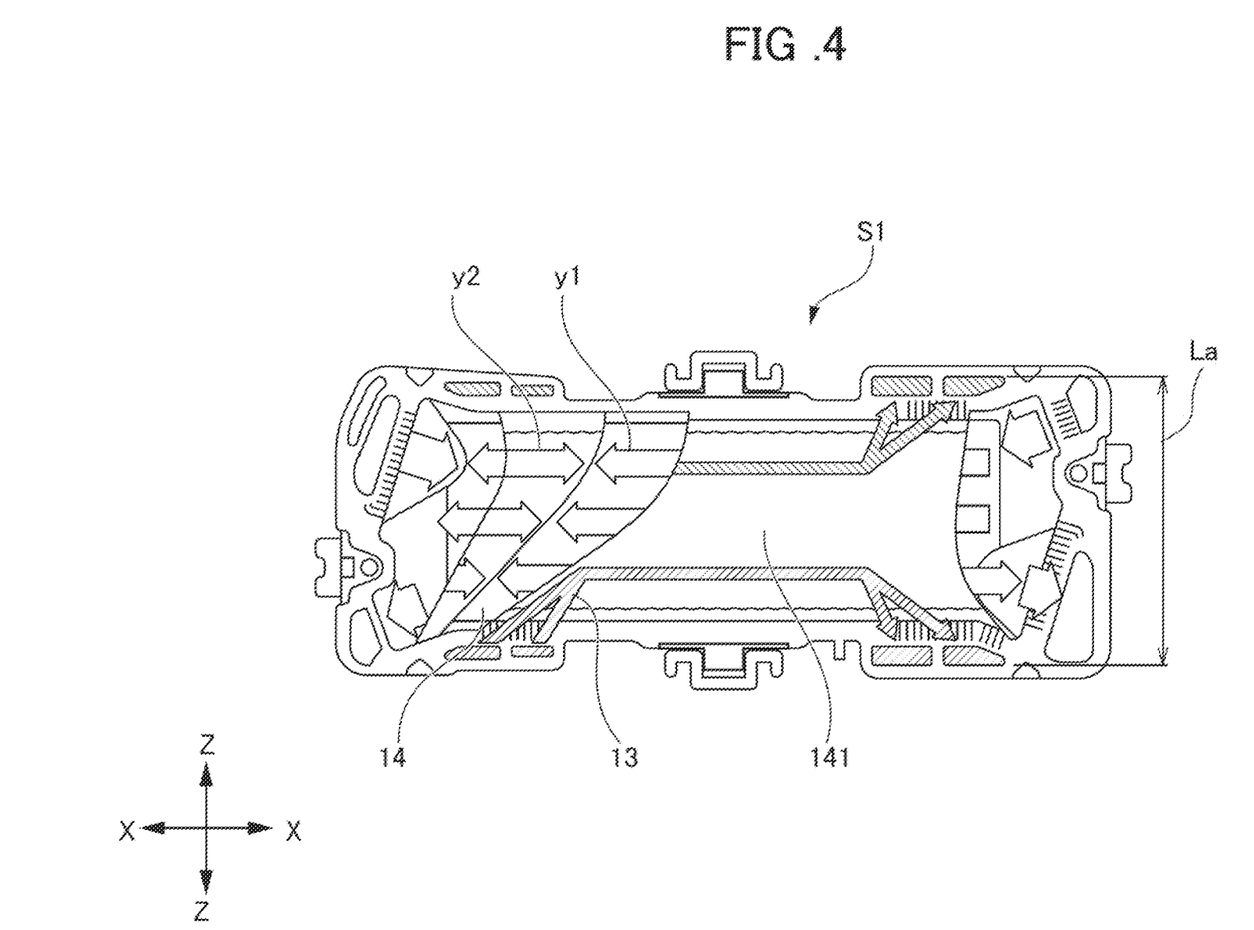
FIG. 4 is a schematic view schematically showing a fuel cell stack according to the embodiment.

FIG. 4 is a schematic view schematically showing the fuel cell stack S1. The fuel cell stack S1 has, for example, a stack structure where several tens to several hundreds of cells are stacked. Each fuel cell is formed by sandwiching a membrane electrode assembly (MEA) 14 between a pair of separators 141. The membrane electrode assembly 14 includes, for example, two electrodes including an anode electrode (cathode) and a cathode electrode (anode), and a solid polymer electrolyte membrane sandwiched between these electrodes. On supplying hydrogen to an anode flow path y1 formed on an anode electrode side and supplying air containing oxygen to a cathode flow path y2 formed on a cathode electrode side, power generation is performed by these electrochemical reactions.

In the fuel cell stack S1, a coolant flow path 13 is formed. With circulation of the coolant in the coolant flow path 13, the fuel cell stack S1 is cooled with heat exchange and does not exceed an upper limit temperature determined to protect the fuel cell stack S1. The supply pipeline L11 and the discharge pipeline L21 are arranged within the formation range La where the coolant flow path 13 is formed in the fuel cell stack S1, in the Z-direction that is the direction of gravity.

Figure 5:
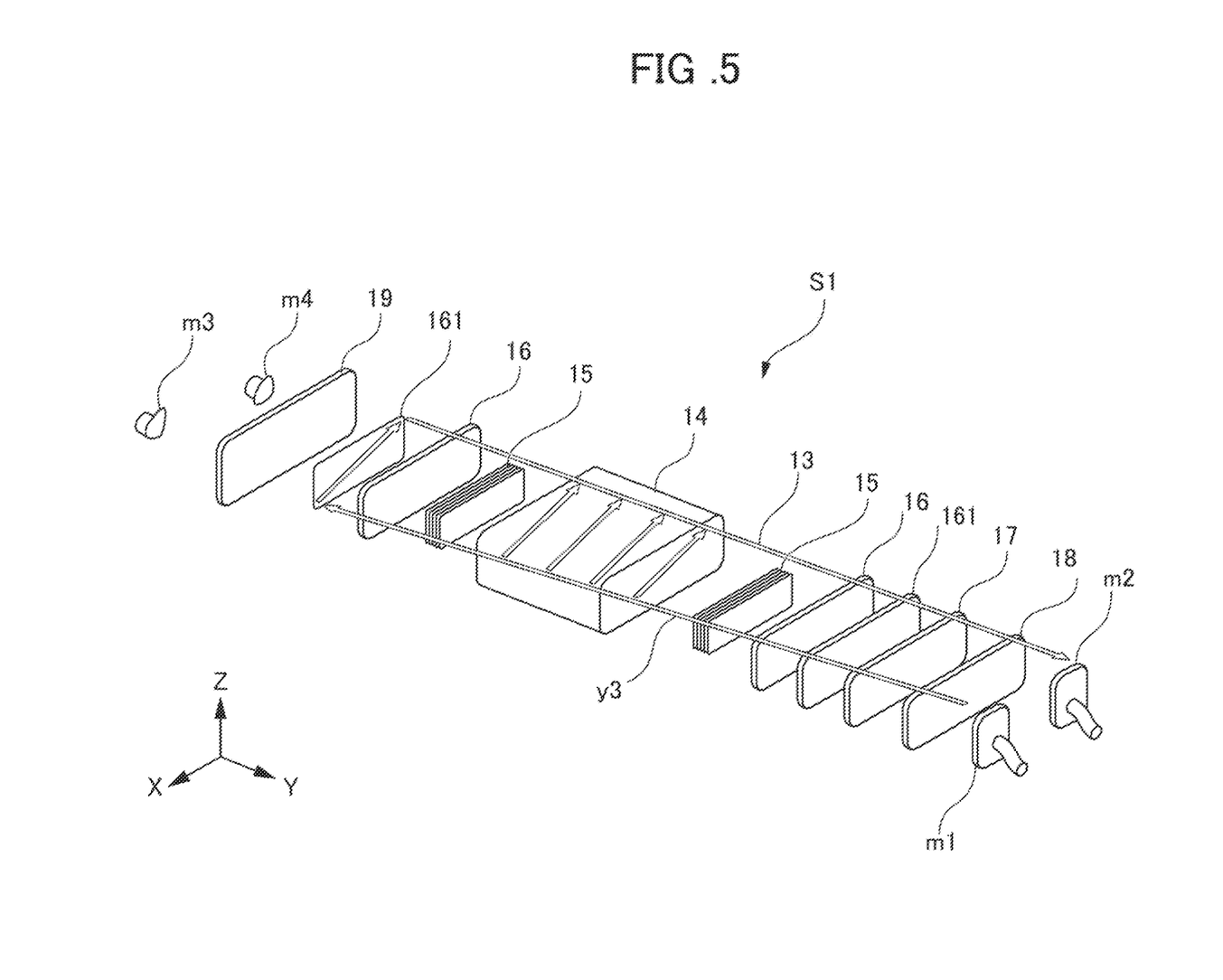
FIG. 5 is an exploded perspective view showing a configuration of the fuel cell stack according to the embodiment.
Figure 6:
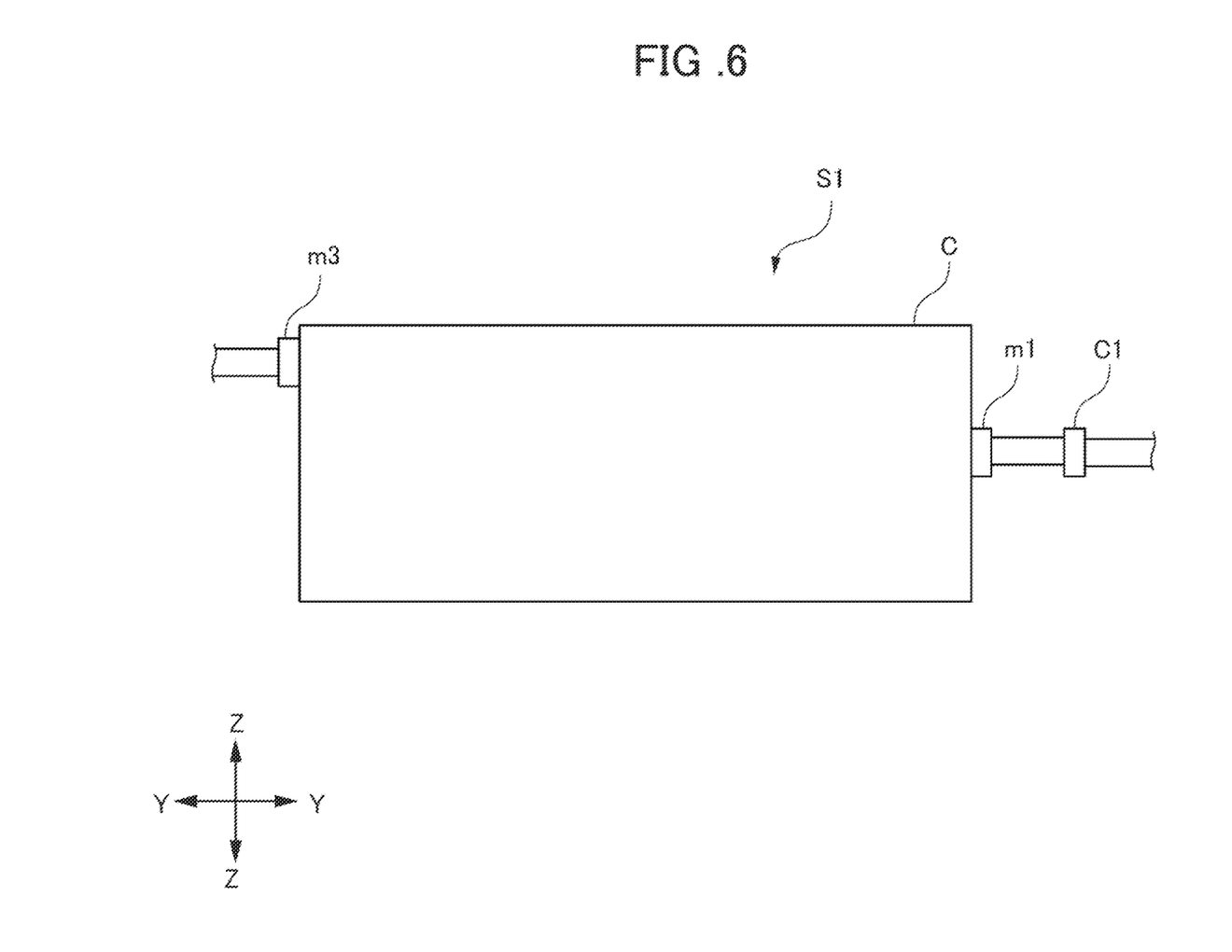
FIG. 6 is a side view showing the configuration of the fuel cell stack according to the embodiment.

The configuration of the fuel cell stack S1 is not particularly limited and includes, for example, a power generation unit including the membrane electrode assembly 14, an insulation structure 15, an insulator 16, a seal plate 161, a spacer 17, an end plate 18, and a breathing 19 as shown in FIG. 5. In the fuel cell stack S1, the coolant flow path 13 extends in a direction of an arrow y3.

In a surface of the fuel cell stack S1 at one end of a side on which the supply pipeline L11 and the discharge pipeline L21 are arranged, manifolds m1 and m2 that communicate with the coolant flow path 13 are provided. The manifold m1 is connected to the supply pipeline L11 via the supply side connecting part C1. The manifold m2 is connected to the discharge pipeline L21 via the discharge side connecting part C2.

In a surface of the fuel cell stack S1 that is adjacent to the other side and faces the one end side surface, the breathing 19 including exhaust port s m3 and m4 is provided. The breathing 19 has a function of exhausting a gas such as air retained in the coolant flowing through the coolant flow path 13, through the exhaust ports m3 and m4 to the outside of the fuel cell stack S1. The exhaust ports m3 and m4 are connected to a reserve tank (not shown). As shown in FIG. 6, the exhaust ports m3 and m4 are provided above the manifolds m1 and m2 in the Z-direction as the direction of gravity. Consequently, the gas retained in the fuel cell stack S1 can be efficiently exhausted through the exhaust ports m3 and m4 to the outside.

(Heat Exchanger)

The heat exchanger 20 is a device for use in cooling the coolant flowing through the supply pipeline and the discharge pipeline. The heat exchanger 20 is not particularly limited, and examples of the heat exchanger include a cooling tower, a radiator, a heater core, an oil cooler, and a chiller. In the present embodiment, the heat exchanger 20 is such an open cooling tower as shown in FIG. 1. As shown in FIG. 1, the heat exchanger 20 includes a main body 21, a dripping pipe 22, a circulation flow path L4, and a fan F.

The main body 21 stores cooling water W circulating in the heat exchanger 20 downward and accommodates the supply pipeline and the discharge pipeline that are cooling targets, and the dripping pipe 22 inside. As shown in FIG. 1, an upstream side end portion of the supply pipeline L11 of the power supplier G1 and a downstream side end portion of the discharge pipeline L21 are connected by a connecting part Lc1 disposed in the main body 21. Similarly, an upstream side end portion of the supply pipeline L12 of the power supplier G2 and a downstream side end portion of the discharge pipeline L22 are connected by a connecting part Lc2 disposed in the main body 21. The connecting parts Lc1 and Lc2 are not particularly limited and may only connect the supply pipeline and the discharge pipeline such that the coolant can flow through the pipelines. Furthermore, the connecting parts Lc1 and Lc2 are coupled to each other by a coupling flow path L3. Consequently, not only a flow rate and temperature of the coolant flowing through the plurality of power suppliers G1 and G2 but also an ion conductivity can be uniformized. The respective fuel cell stacks might cause a difference in power consumption and might cause a difference in the amount of ions eluted. When the ion conductivity in the cooling water is high, deterioration of the fuel cell stack increases, but according to the configuration of the present embodiment, the ion conductivity of the coolant flowing through each fuel cell stack can be uniformized. Consequently, durability of the respective fuel cell stacks is uniformized, and as a result, durability of the whole fuel cell system 1 can improve.

The dripping pipe 22 is provided extending in the horizontal direction in an upper part of the heat exchanger 20. The dripping pipe 22 is connected to the circulation flow path L4, and drips downward the cooling water supplied from the circulation flow path L4, in the main body 21. As shown in FIG. 1, the cooling water dripping from the dripping pipe 22 comes in contact with the supply pipeline and the discharge pipeline to perform heat exchange, and then drops down to a lower part of the main body 21.

The circulation flow path L4 supplies, to the upper part of the heat exchanger 20, the cooling water W used in cooling the discharge pipeline L21 and having an elevated temperature. For example, as shown in FIG. 1, the circulation flow path L4 is provided extending from the lower part of the main body 21 toward the upper part.

The fan F is provided in the upper part of the heat exchanger 20 and is rotated and driven to introduce outside air into the heat exchanger.

As above, the embodiment of the present invention is described, but the present invention is not limited to the above embodiment and may be appropriately modified.

EXPLANATION OF REFERENCE NUMERALS 1 fuel cell system
13 coolant flow path
20 heat exchanger
3 replenishment port
L11 and L12 supply pipeline
L21 and L22 discharge pipeline
C1 supply side connecting part
C2 discharge side connecting part
Lc1 and Lc2 connecting part
L3 coupling flow path
G1 and G2 power supplier
S1 to S10 fuel cell stack

What is claimed is:

1. A fuel cell system comprising:
a plurality of fuel cell stacks each having a stack structure in which a plurality of fuel cells are stacked and each provided with a coolant flow path through which a coolant flows,
wherein the plurality of fuel cell stacks are juxtaposed in a horizontal direction, and
include a supply pipeline that distributes and supplies the coolant to the coolant flow path, and
a discharge pipeline that collects and discharges the coolant that has flowed through the coolant flow path,
wherein the fuel cell system further comprises the supply pipeline and the discharge pipeline are provided within a formation range where the coolant flow path is formed in the plurality of fuel cell stacks, in a direction of gravity,
wherein the supply pipeline and the discharge pipeline extend from one end side to an other end side of the plurality of juxtaposed fuel cell stacks, and each of the supply pipeline and the discharge pipeline branches to be connected to the coolant flow path of each of the plurality of juxtaposed fuel cell stacks, and
wherein the discharge pipeline is provided closer to the plurality of fuel cell stacks than the supply pipeline.

2. The fuel cell system according to claim 1,
wherein the supply pipeline slopes downward with respect to the horizontal direction from an upstream side to a downstream side, and
wherein the discharge pipeline slopes upward with respect to the horizontal direction from the upstream side to the downstream side.

3. The fuel cell system according to claim 1, further comprising:
a supply side connecting part that connects the coolant flow path to the supply pipeline; and
a discharge side connecting part that connects the coolant flow path to the discharge pipeline,
wherein at least one of the supply side connecting part and the discharge side connecting part is a removable connecting part.

4. The fuel cell system according to claim 1, further comprising:
a heat exchanger that cools the coolant; and
a connecting part that connects an upstream side end portion of the supply pipeline to a downstream side end portion of the discharge pipeline,
wherein the connecting part is provided in the heat exchanger.

5. The fuel cell system according to claim 4, comprising:
a plurality of power suppliers each including the plurality of fuel cell stacks juxtaposed in the horizontal direction, the supply pipeline, and the discharge pipeline,
wherein the plurality of power suppliers are arranged in the direction of gravity, and
include a coupling flow path that couples, to each other, the connecting parts of the plurality of power suppliers.

6. The fuel cell system according to claim 3,
wherein the fuel cell stack has a surface which is adjacent to one end side and on which the supply side connecting part and the discharge side connecting part are arranged, and a surface which is adjacent to an other end side and which faces the surface adjacent to the one end side, and
wherein the surface adjacent to the other end side is provided with an exhaust port through which a gas retained in the coolant is exhausted to an outside of the fuel cell stack, and
wherein the exhaust port is provided above the supply side connecting part and the discharge side connecting part in the direction of gravity.

7. The fuel cell system according to claim 5, further comprising:
a replenishment port that replenishes the coolant flow path with the coolant, wherein the replenishment port is provided in an uppermost portion of the supply pipeline or the discharge pipeline in the power supplier disposed most upward in the direction of gravity.

* * * * *